Feb. 27, 1940. W. L. McGRATH 2,191,965
REFRIGERATION CONTROL SYSTEM
Filed Sept. 16, 1936 2 Sheets-Sheet 1

Inventor
William L. McGrath
By George H Fisher
Attorney

Feb. 27, 1940.  W. L. McGRATH  2,191,965
REFRIGERATION CONTROL SYSTEM
Filed Sept. 16, 1936  2 Sheets-Sheet 2
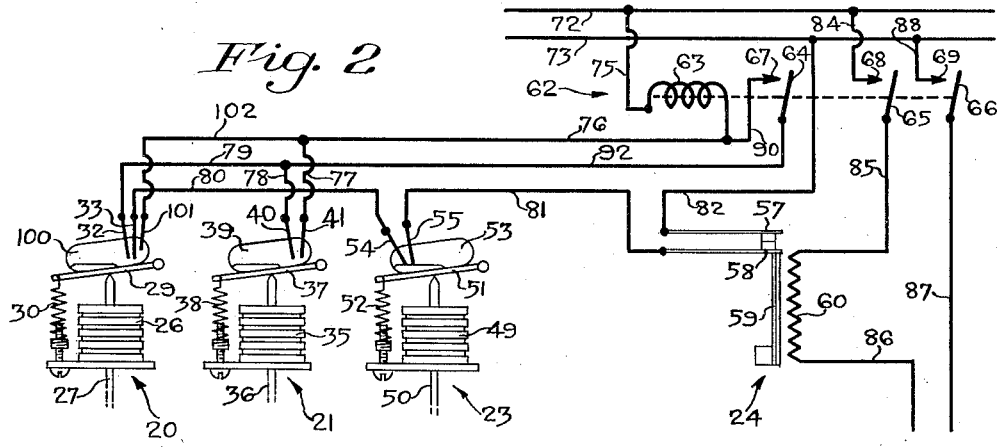
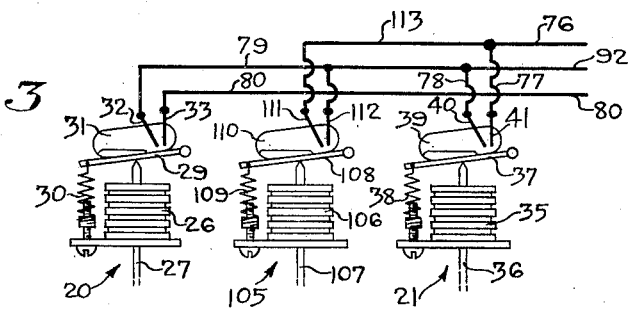
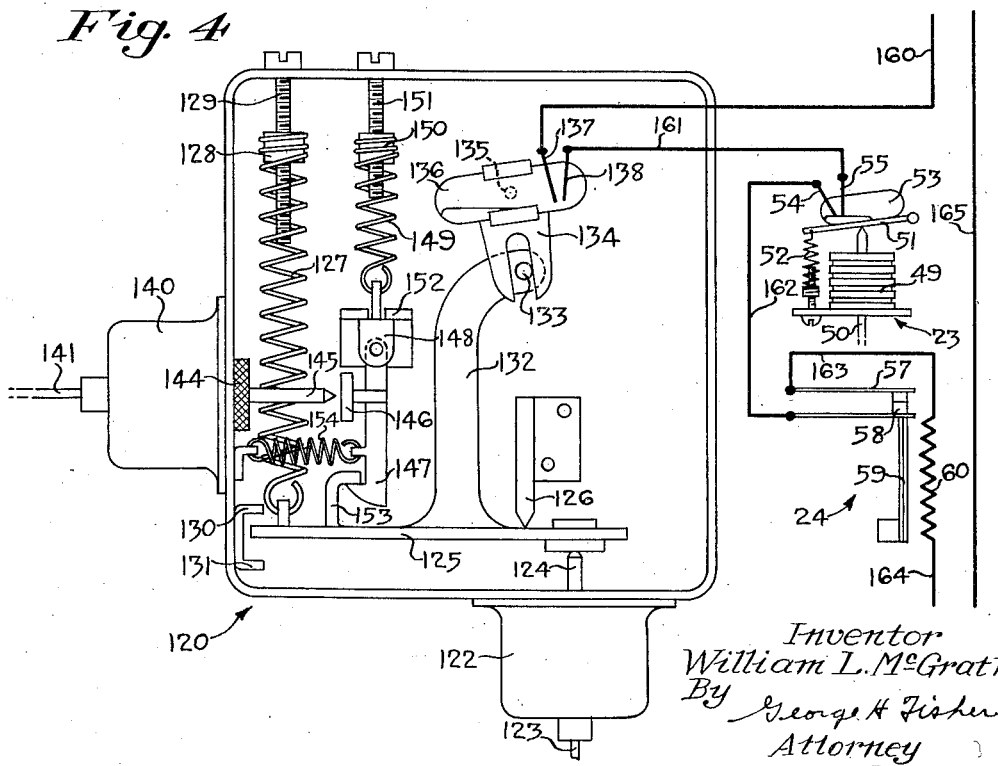
Inventor
William L. McGrath
By George H. Fisher
Attorney

UNITED STATES PATENT OFFICE 2,191,965

REFRIGERATION CONTROL SYSTEM

William L. McGrath, Minneapolis, Minn., assignor to Minneapolis-Honeywell Regulator Company, Minneapolis, Minn., a corporation of Delaware Application September 16, 1936, Serial No. 101,071

13 Claims. (Cl. 62—4)

This invention relates to control systems for a refrigerating apparatus.

It is an object of this invention to provide a control system for a refrigerating apparatus responsive to a condition indirectly produced by the refrigerating apparatus, such as box temperature, and responsive to a condition directly produced by the refrigerating apparatus, such as evaporator temperature or suction pressure, wherein the condition indirectly produced by the refrigerating apparatus and the condition directly produced by the refrigerating apparatus must increase to predetermined values, respectively, in order to start the refrigerating apparatus and wherein the operation of the refrigerating apparatus is continued in accordance with the condition indirectly produced by the refrigerating apparatus independently of the condition directly produced by the refrigerating apparatus. By reason of this construction, defrosting of the refrigerating apparatus during each cycle of operation may be afforded if the control system is adjusted accordingly. Defrosting of the refrigerating apparatus during each cycle of operation prevents the accumulation or building up of ice on the cooling coils thereby decreasing the load on the refrigerating apparatus.

Another object of this invention is to provide in the type of control system outlined above means responsive to the pressure on the high pressure side of the refrigerating apparatus for stopping operation thereof in case the high pressure reaches a predetermined high value.

Still another object of this invention is to provide in combination with the various other elements of the control system as outlined above an overload cut-out mechanism whereby the refrigerating apparatus is shut down in case of current overload conditions.

Under certain circumstances, it may happen that the condition directly produced by the refrigerating apparatus, such as suction pressure, may not be permitted to increase to a defrosting or starting value. Such a circumstance might occur when the refrigerating apparatus is located in a basement or other place the temperature of which may decrease to such a value as to prevent increasing of the suction pressure to a value which would cause defrosting. Under these circumstances, it would be impossible to start the refrigerating apparatus as outlined above. Therefore, auxiliary means must be provided for starting the refrigerating apparatus independently of the condition directly produced by the refrigerating apparatus, such as suction pressure.

It is, therefore, another object of this invention to provide in combination with the type of control system outlined above a means for permitting starting of the refrigerating apparatus even though the condition directly produced by the refrigerating apparatus is prevented from increasing to the desired starting value.

It is another object of this invention to make the auxiliary starting means outlined above responsive to basement temperatures in case the refrigerating apparatus should be located in the basement.

A further object of this invention is to make the auxiliary starting apparatus responsive to a predetermined higher value of the condition indirectly produced by the refrigerating apparatus, such as an increase of the box temperature to a predetermined high value.

Still another object of this invention is to provide the desired mode of operation outlined above by means of an electric system utilizing a plurality of cooperating switching mechanisms.

A further object of this invention is to provide a refrigerating control mechanism to perform the desired results by utilizing a mechanical arrangement.

Another object of this invention is to provide adjustments for the various control elements of the control system whereby the response of the various elements to the various conditions may be adjusted at will to give an extremely flexible control system.

Other objects and advantages will become apparent to those skilled in the art upon reference to the accompanying specification, claims and drawings.

For a more thorough understanding of this invention, reference is made to the accompanying drawings, in which:

Figure 2 is a partial diagrammatic illustration of a modified control arrangement wherein the auxiliary starting means is made responsive to a predetermined rise in the condition indirectly produced by the refrigerating apparatus.

Figure 3 is a partial diagrammatic illustration showing a construction slightly different than that illustrated in Figure 2.

Figure 4 is a diagrammatic illustration of another form of my invention for accomplishing mechanically that which is accomplished by switching mechanisms in Figures 2 and 3.

Figure 1:
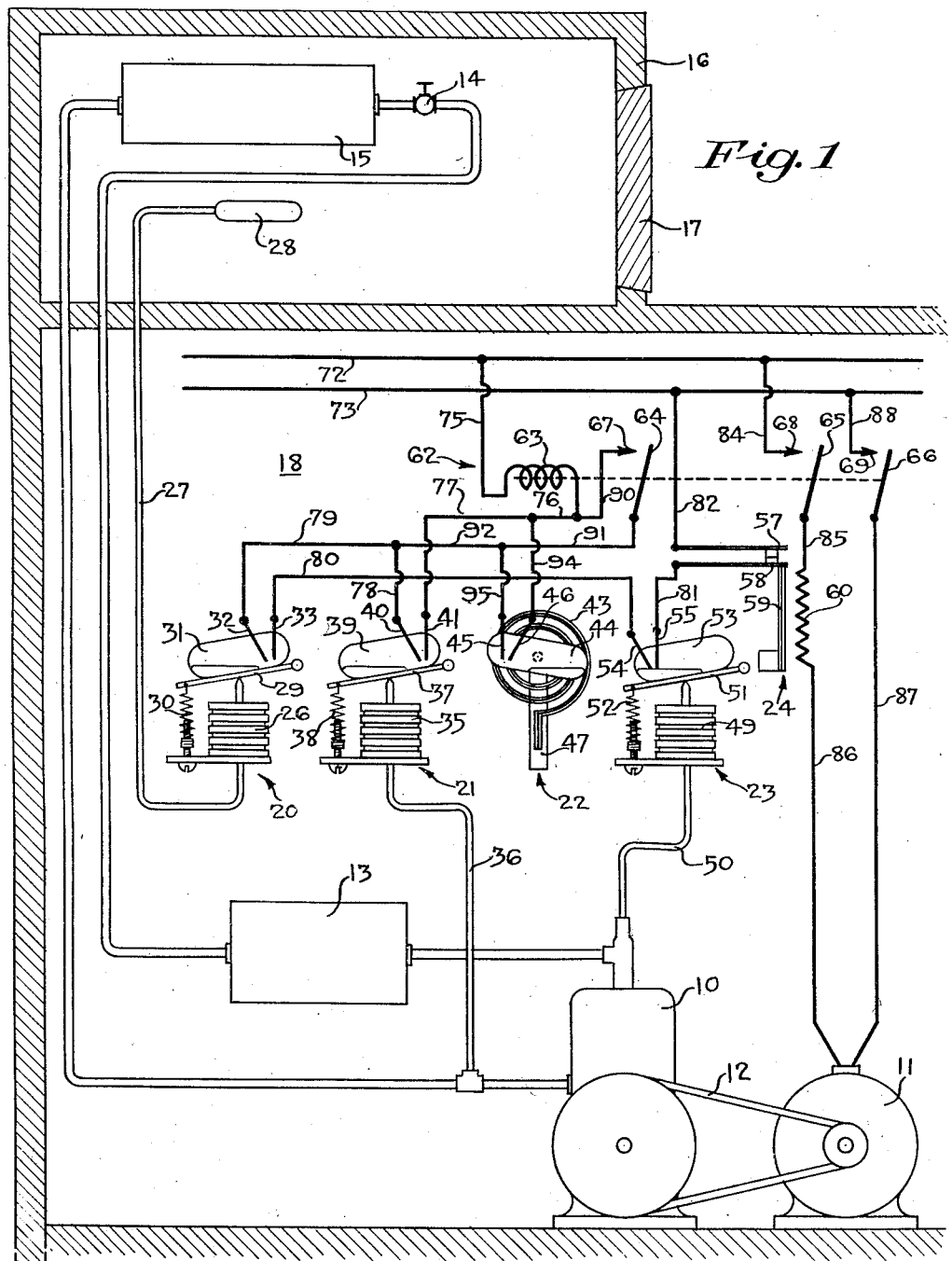
Figure 1 is a diagrammatic illustration of one form of my invention wherein the auxiliary starting means is made responsive to basement temperatures.

Referring now to Figure 1, the refrigerating apparatus is shown to comprise a compressor 10 operated by an electric motor 11 through a belt 12, a condenser 13, an expansion valve 14 and an evaporator 15, all connected together in a manner well known in the art. The evaporator 15 may perform a cooling function and for purposes of illustration I have shown the evaporator 15 located in a refrigerating compartment or box 16 for cooling the interior thereof. The compartment or box 16 may be provided with a door 17. The refrigerating apparatus is shown to be located in a basement 18 although it could be located in any other place.

The means responsive to the condition indirectly produced by the refrigerating apparatus is shown for purposes of illustration to comprise a thermostatic switching mechanism generally designated at 20 responsive to box temperatures. The means responsive to the condition directly produced by the refrigerating apparatus is shown to comprise a pressure switching mechanism 21 responsive to suction pressure although it is within the contemplation of this invention to use a temperature responsive switching mechanism responsive to evaporator temperatures, it being known that evaporator temperature and suction pressure have a parallel relationship. Accordingly the switching mechanism 21 is operated in accordance with a condition indicative of evaporator temperature. The auxiliary starting means is shown to comprise an ambient temperature responsive switching mechanism generally designated at 22 and responsive to temperatures near the compressor or the suction line. The high pressure cut-out mechanism is generally designated at 23 and the overload cut-out mechanism is generally designated at 24.

The temperature responsive switching mechanism 20 may comprise a bellows 26 connected by a capillary tube 27 to a bulb 28 having a volatile fill and located in the box 16 so as to be responsive to the temperature thereof. The bellows 26 may operate a lever 29 against the tension of an adjustable tension spring 30. The lever 29 operates a mercury switch 31 having electrodes 32 and 33. The arrangement is such that as the box temperature increases, the mercury switch 31 is tilted to cause bridging of the electrodes 32 and 33. The temperature value at which the electrodes 32 and 33 are bridged may be adjusted by suitably adjusting the tension spring 30. For purposes of illustration, it is assumed that the mercury switch 31 is moved to a circuit making position when the box temperature increases to 43° and to a circuit breaking position when the box temperature decreases to 40°.

The suction pressure switching mechanism 21 is shown to comprise a pressure bellows 35 connected by a pipe 36 to the low pressure or suction pressure side of the refrigerating apparatus. The pressure bellows 35 operates a lever 37 against the action of an adjustable tension spring 38. The lever 37 operates a mercury switch 39 which has electrodes 40 and 41. The arrangement is such that as the suction pressure increases, the electrodes 40 and 41 are bridged. By suitably adjusting the tension spring 38, the suction pressure setting may be adjusted at will and for purposes of illustration it is assumed that the switch 39 is moved to a circuit making position when the suction pressure increases to 30 lbs. It is also assumed that this 30 lb. suction pressure is sufficiently high to result in an evaporator temperature that will cause the evaporator to defrost.

The basement temperature responsive switching mechanism 22 is shown to comprise a bimetallic element 43 for operating a mercury switch 44, which mercury switch contains electrodes 45 and 46. The arrangement is such that as the basement temperature decreases below a predetermined value, the electrodes 45 and 46 are bridged. The setting of this temperature responsive switching mechanism may be adjusted by a suitable hand lever 47 and for purposes of illustration it is assumed that the mercury switch 44 is moved to a circuit making position when the ambient temperature, such as basement temperature, decreases to some value below 40°, it being assumed, also, that the establishment of a suction pressure of 30 lbs. is prevented when the ambient temperature decreases to a value below 30°.

The high pressure cut-out mechanism 23 may comprise a pressure bellows 49 connected by a pipe 50 to the high pressure side of the refrigerating apparatus. The pressure bellows 49 may operate a lever 51 against the action of an adjustable tension spring 52. The lever 51 operates a mercury switch 53 having electrodes 54 and 55. Electrodes 54 and 55 are normally bridged by the mercury and when the high pressure increases to a predetermined value the mercury switch 53 is moved to a circuit breaking position. By suitably adjusting the tension spring 52, the pressure setting of this high pressure cut-out may be adjusted at will. For purposes of illustration, it is assumed that the mercury switch 53 is moved to a circuit breaking position when the pressure on the high pressure side of the refrigerating apparatus increases to 170 lbs.

The overload cut-out mechanism 24 is shown to comprise contacts 57 and 58 which are held in engagement by means of a bimetallic element 59. A heater 60 is closely associated with the bimetallic element 59, the arrangement being such that when the current flow through the heater 60 increases above a predetermined value the bimetallic element 59 is flexed to the right to release the contact 58 whereby the contact 58 moves away from the contact 57. Manual resetting of the contacts 57 and 58 is required.

This invention also contemplates the use of a relay generally designated at 62 comprising a relay coil 63 for operating switch arms 64, 65, and 66 with respect to stationary contacts 67, 68, and 69. The arrangement is such that when the relay coil 63 is energized, switch arms 64, 65, and 66 are moved into engagement with their respective contacts 67, 68, and 69. When the relay coil 63 is deenergized, the switch arms are moved out of engagement with their respective contacts by means of springs, gravity or other means (not shown). Power is supplied to the control system and to the refrigerating apparatus by means of line wires 72 and 73 leading from some source of power (not shown).

Assume the various parts in the position shown in Figure 1, the box temperature is below 43°, the suction pressure is less than 30 lbs., the basement temperature is above 40° and the pressure on the high pressure side of the refrigerating apparatus is less than 170 lbs. Therefore, no circuits are completed and the relay 62 is deenergized. Assume now that the box temperature increases to 43° to cause movement of the mercury switch 31 to a circuit making position.

This movement, however, does not cause energization of the relay 62. When the mercury switch 39 is moved to a circuit making position upon the suction pressure assuming a value of 30 lbs., a starting circuit is completed from the line wire 72, through wire 75, relay coil 63, wires 76 and 77, electrodes 41 and 40 of the suction pressure switching mechanism 21, wires 78 and 79, electrodes 32 and 33 of the box temperature responsive switching mechanism 20, wire 80, electrodes 54 and 55 of the high pressure cut-out switching mechanism 23, wire 81, contacts 56 and 57 of the overload cut-out mechanism 24 and wire 82 back to the other line wire 73. Completion of this starting circuit upon closure of switches 31 and 39 causes energization of the relay coil 63. Energization of the relay coil 63 causes movement of the switch arms 65 and 66 into engagement with the contacts 68 and 69. Closure of these switches completes a circuit from the line wire 72 through wire 84, contact 68, switch arm 65, wire 85, heater 60, wire 86, compressor motor 11, wire 87, switch arm 66, contact 69 and wire 88 back to the other line wire 73. This causes operation of the compressor motor 11 and consequent operation of the refrigerating apparatus.

Energization of the relay coil 63 also moves switch arm 64 into engagement with contact 67 to complete a maintaining circuit from the line wire 72 through wire 75, relay coil 63, wire 90, contact 67, switch arm 64, wires 91, 92, and 79, electrodes 32 and 33, wire 80, electrodes 54 and 55, wire 81, contacts 58 and 57, and wire 82 back to the other line wire 73. Completion of this circuit maintains the relay coil 63 energized and consequently maintains the refrigerating apparatus in operation as long as the mercury switch 31 is held in a closed position. The mercury switch 39 of the suction pressure responsive switching mechanism 21 is not included in this maintaining circuit and, therefore, the refrigerating apparatus is continued in operation independently of the value of the suction pressure. The refrigerating apparatus, therefore, is maintained in operation until such time as the box temperature shall decrease to 40° as illustrated.

When the box temperature decreases to 40° to open the switch 31, the relay coil 63 is deenergized and the refrigerating apparatus is stopped. In order to restart the refrigerating apparatus under normal conditions, both the switches 31 and 39 must again close. Therefore, the refrigerating apparatus may be placed in operation only when the box temperature and the suction pressure shall rise to predetermined values and is brought to a stop only when the box temperature drops to a predetermined value.

It is noted at this point that the mercury switch 53 of the high pressure cut-out 23 and the contacts 57 and 58 of the overload cut-out mechanism 24 are contained in both the starting and maintaining circuits of the relay 62. Therefore, if the pressure on the high pressure side of the refrigerating apparatus should increase above a predetermined high value, as 170 lbs., or if the current supplied to the compressor motor 11 should become abnormally great, the refrigerating apparatus will be shut down.

As stated above, it may be impossible for the suction pressure to increase to the defrosting value of 30 lbs., as when the refrigerating apparatus is located in a basement or other cool place and the basement temperature should decrease below a predetermined value. It is assumed for purposes of illustration, that a basement temperature somewhat below 40° would prevent the suction pressure of the refrigerating apparatus from rising to 30 lbs., therefore, if the basement temperature were somewhat less than 40°, the refrigerating apparatus as outlined above could not be placed in operation. Therefore, provision must be made for starting the refrigerating apparatus independently of the suction pressure switching mechanism when this condition occurs. This is accomplished by means of the basement temperature responsive switching mechanism 22 being connected in parallel with the suction pressure switching mechanism 21. This parallel arrangement is afforded by the wires 94 and 95 connecting the electrodes 46 and 45, respectively, of the mercury switch 44 to the wires 76 and 92, respectively.

Assume now that the box temperature has increased to 43° so as to close the mercury switch 31, that the basement temperature is below 40° whereupon the mercury switch 44 is closed, a starting circuit is completed from the line wire 72 through wire 75, relay coil 63, wires 76 and 94, electrodes 46 and 45, wires 95, 92, and 79, electrodes 32 and 33, wire 80, electrodes 54 and 55, wire 81, contacts 58 and 57, and wire 82 back to the other line wire 73. In this manner, the relay coil 63 is energized and the refrigerating apparatus is placed in operation independently of the value of suction pressure when the box temperature increases to 43° and when the basement temperature is below a predetermined value. After the refrigerating apparatus is placed in operation in this manner, it is maintained in operation by the above referred to maintaining circuit independently of the suction pressure responsive switching mechanism 21 and the basement temperature responsive switching mechanism 22.

Another manner of starting the refrigerating apparatus independently of the value of suction pressure is shown in Figure 2. Figure 2 is in all respects similar to Figure 1, the same box temperature responsive switching mechanism 20, the suction pressure switching mechanism 21, the high pressure cut-out switching mechanism 23, the overload cut-out switching mechanism 24 and the relay 62 being utilized. In Figure 2, however, the basement temperature responsive switching mechanism 22 is omitted. The auxiliary starting means in Figure 2 is provided by the use of a different type of mercury switch operated by the box temperature responsive switching mechanism 20. This switch is designated at 100 and contains electrodes 32 and 33 as in Figure 1 but in addition has a shorter electrode 101. Therefore, when the box temperature increases to 43°, electrodes 32 and 33 are bridged as in Figure 1 and when the box temperature increases to a higher value, say 46°, electrodes 32, 33, and 101 are bridged. Electrode 101 is connected by a wire 102 to the junction of wires 76 and 77. Where the structure and wiring connections of Figure 2 are the same as in Figure 1, like reference characters are used.

With the parts in the position shown in Figure 2, the box temperature is below 43°, the suction pressure is less than 30 lbs., and the pressure on the high pressure side of the refrigerating apparatus is less than 170 lbs. Relay coil 63 is, therefore, deenergized and the refrigerating apparatus is shut down. Since the refrigerating apparatus is not in operation, the box temperature starts to increase and when the box temperature increases to 43° electrodes 32 and 33 are bridged. It is assumed now that conditions are present which prevent the suction pressure from rising to 30 lbs. and, therefore, the refrigerating apparatus normally could not be started. As a result of this, the box temperature increases to 46° whereupon all three electrodes 32, 33, and 101 are bridged. This completes a starting circuit for the relay coil 63 from the line wire 72 through wire 75, relay coil 63, wires 76 and 102, electrodes 101 and 33, wire 80, electrodes 54 and 55, wire 81, contacts 58 and 57, and wire 82 back to the other line wire 73. Completion of this auxiliary starting circuit causes energization of the relay coil 63 to move the switch arms 65 and 66 into engagement with the contacts 68 and 69 to cause operation of the refrigerating apparatus. Energization of the relay coil 63 in this manner also moves the switch arm 64 into engagement with the contact 67 to complete a maintaining circuit independently of the electrode 101, which circuit may be traced from the line wire 72 through wire 75, relay coil 63, wire 90, contact 67, switch arm 64, wires 92 and 79, electrodes 32 and 33, wire 80, electrodes 54 and 55, wire 81, contacts 58 and 57, and wire 82 back to the other line wire 73. Completion of this maintaining circuit maintains the refrigerating apparatus in operation independently of the value of the suction pressure and the electrode 101 until such time as the box temperature shall decrease to 40° to break contact between the electrodes 32 and 33.

In this modification, it is seen that I have, therefore, provided a control mechanism for a refrigerating apparatus as in the preceding modification wherein both the box temperature and suction pressure must increase to predetermined values in order to start the refrigerating apparatus and wherein the refrigerating apparatus is maintained in operation independently of the value of suction pressure until such time as the box temperature is decreased to the desired value. In this modification, as well as in the previous modification, means have been provided for starting the refrigerating apparatus independently of the value of the suction pressure. In Figure 2, however, this auxiliary starting mechanism is controlled in repsonse to box temperatures instead of in response to basement temperatures as in the preceding modification.

Figure 3 shows a slightly different manner of obtaining the same mode of operation as is obtained in Figure 2. The same box temperature responsive switching mechanism 20 and suction pressure switching mechanism 21 are used as in Figures 1 and 2, and these various switching mechanisms are connected together as in Figures 1 and 2 and, therefore, like reference characters have been used. A box temperature responsive switching mechanism 105 is utilized to cause auxiliary starting of the refrigerating apparatus. This switching mechanism 105 may comprise a bellows 106 connected by a capillary tube 107 to a bulb (not shown) located in the box 16. The bellows 106 may operate a lever 108 against the action of an adjustable tension spring 109. Lever 108 operates a mercury switch 110 which has electrodes 111 and 112. Electrode 112 is connected to the wire 79 and the electrode 111 is connected by a wire 113 to the wire 76. It is, therefore, seen that the mercury switch 110 is connected in parallel with the suction pressure switch 21. The setting of the temperature responsive switching mechanism 105 is preferably adjusted so that the mercury switch 110 will be moved to a circuit making position when the box temperature rises to 46°. Therefore, in this modification, as in the modification illustrated in Figure 2, the refrigerating apparatus may be started independently of the value of the suction pressure when the box temperature increases to a predetermined higher value. In all other respects, the operation of Figure 3 is identical to that of Figure 2. Figure 3 forms a slight improvement over Figure 2 in that the auxiliary starting temperature may be adjusted with respect to the normal starting temperature which could be accomplished in Figure 2 only by substituting for the mercury switch 100 another mercury switch having different electrode spacings.

Referring now to Figure 4, I have shown a mechanism which accomplishes mechanically the same results as are accomplished electrically in Figures 2 and 3. In Figure 4, I also contemplate the use of a high pressure cut-out 23 and an overload cut-out 24 and like reference characters have been used. The starting of the refrigerating apparatus and the maintenance of the refrigerating apparatus in operation after being started is accomplished by a switching mechanism generally designated at 120. The mechanism 120 is shown to comprise a bellows casing 122 containing a bellows therein which is connected by a capillary tube 123 to a bulb (not shown) located in the box 16. The bellows within the bellows casing 122 is adapted to operate a plunger 124 which abuts a lever 125 pivoted at 126. Lever 125 is urged in a clockwise direction by an adjustable tension spring 127 which is secured to a nut 128 screw threadedly mounted on a screw 129. Upper and lower stops 130 and 131 are provided for limiting the movement of lever 125. Upon an increase in temperature in the box 16, lever 125 is rotated in a counter-clockwise direction towards the lower stop 131 against the bias of the spring 127. Upon a decrease in temperature within the box 16, the spring 127 rotates the lever 125 in a clockwise direction towards the upper stop 130. By adjusting the tension in spring 127, the temperature setting of the instrument 120 may be adjusted at will.

The lever 125 carries an arm 132 upon which is mounted a pin 133. The pin 133 is adapted to engage between bifurcated ends of a mercury switch clip 134 pivoted at 135. The mercury switch clip 134 carries a mercury switch 136 which has electrodes 137 and 138. The arrangement is such that when the temperature in the box 16 increases to a predetermined value, say 43°, the switch 136 is tilted to cause the mercury to bridge the electrodes 137 and 138. Upon a decrease in temperature to, say 40°, the mercury switch 136 is tilted to the position shown in the drawings to break the circuit connection between the electrodes 137 and 138.

The control mechanism generally designated at 120 also comprises a bellows casing 140 containing a bellows which is connected by a pipe 141 to the low pressure side of the refrigerating apparatus. A spring within the bellows casing 140 and consequently the pressure setting of the instrument 120 may be adjusted by means of a knurled knob 144 in a manner well known in the art. The bellows in the casing 140 operates a plunger 145 which is adapted to engage an abutment 146 carried by a latch member 147. The latch member 147 is pivotally mounted on a bracket 148 which is supported by a spring 149 which in turn is connected to a nut 150 mounted on a screw 151. Upward movement of the bracket 148 by the spring 149 is limited by a stationary bracket 152 and by suitably rotating the screw 151 the tension of spring 149 may be adjusted at will. The lever 125 carries an abutment 153 which is adapted to be engaged by the latch 147, the latch 147 being urged into engagement with the abutment 153 by a tension spring 154.

A wire 160 leading from some source of power (not shown) is connected to the electrode 137 of mercury switch 136. The other electrode 138 is connected by a wire 161 to electrode 55 of the high pressure cut-out switch 23. The other electrode 54 of the high pressure cut-out switch 23 is connected by a wire 162 to the contact 58 of the overload cut-out switch 24. The contact 57 is connected by a wire 163 to the heater 60 which in turn is connected by a wire 164 to the compressor motor 11 (not shown). Compressor motor 11 is in turn connected by a wire 165 to the source of power.

With the parts in the position shown in the drawings, the box temperature is below 43° and the suction pressure is below, say 30 lbs., therefore, the switch 136 is open and the refrigerating apparatus is stopped. Since the refrigerating apparatus is not in operation, the temperature of the box 16 increases causing expansion of the bellows within the bellows casing 122 to tend to move the lever 125 in a counterclockwise direction. Movement of the lever 125 in a counterclockwise direction is prevented by the latch 147. Since the refrigerating apparatus is not in operation, the suction pressure also increases to cause expansion of the bellows within the bellows casing 140. When the suction pressure increases to, say 30 lbs., the plunger 145 engages the abutment 146 to move the latch 147 out of engagement with the abutment 153 whereupon the bellows within the casing 122 rotates the lever 125 in a counter-clockwise direction to cause making of the mercury switch 136. Making of the mercury switch 136 completes the circuit to the compressor motor to cause operation of the refrigerating apparatus. Operation of the refrigerating apparatus in this manner causes a reduction in suction pressure but this reduction in suction pressure has no effect upon the continued operation of the refrigerating apparatus since the plunger 145 is merely withdrawn from the abutment 146. The switch is, therefore, maintained in a circuit making position by the bellows contained within the bellows casing 122. Operation of the refrigerating apparatus causes a decreasing of the temperature within the box 16 and, therefore, the spring 127 tends to move the lever 125 in a clockwise direction. When the box temperature decreases to, say 40°, the spring 127 moves the lever 125 sufficiently far to operate the switch 136 to open the circuit to the compressor motor and to cause latch 147 to engage with the abutment 153 to place the parts in the position shown in Figure 4 for another cycle of operation.

From the above it is seen that the box temperature must rise to a sufficiently high value, say 43°, to have sufficient power to move the switch 136 to a circuit making position and the suction pressure must rise to a sufficiently high value, say 30 lbs., to cause releasing of the latch 147 to permit the switch 136 to be moved to the circuit making position. The bellows contained within the bellows casing 140 operated in response to changes in suction pressure cannot shut down the refrigerating apparatus. The refrigerating apparatus may only be shut down by the box temperature control portion of the system. Here, as in the previous modifications, the high pressure cut-out switch 23 and the overload cut-out switch 24 are connected in series in the compressor motor circuit whereby a dangerous load condition or a dangerous high pressure on the high pressure side of the refrigerating apparatus will cause shutting down of the refrigerating apparatus. By suitably adjusting the tension of spring 127, the temperature setting of the mechanism 120 may be adjusted at will. By adjusting the knurled knob 144, the pressure setting may be adjusted at will.

Provision is made in this modification, as in the previous modifications, for starting the refrigerating apparatus independently of the suction pressure control. This is accomplished by means of the spring mounted latch means. Assume that the temperature of the box rises to 43° but that the suction pressure does not rise to 30 lbs., the refrigerating apparatus is, therefore, not placed in operation. If, however, the box temperature rises above 43° to, say 46°, sufficient pressure is developed within the bellows in the bellows casing 122 to overcome the tension in the spring 149 whereupon the switch 136 is tilted to the circuit making position. By suitably adjusting the tension in the spring 149, the temperature setting at which the refrigerating apparatus is placed in operation independently of the suction pressure control may be varied at will.

From the above it is seen that I have provided a control system for a refrigerating apparatus either electrical or mechanical wherein the refrigerating apparatus is started only when the condition indirectly produced by the refrigerating apparatus and the condition directly produced by the refrigerating apparatus increase to predetermined values, respectively, wherein the refrigerating apparatus is maintained in operation under the control of the condition indirectly produced by the refrigerating apparatus, wherein the refrigerating apparatus may be stopped only upon the condition indirectly produced by the refrigerating apparatus decreasing to a given value, and wherein the refrigerating apparatus may be started independently of the condition directly produced by the refrigerating apparatus under certain conditions, one condition being the existence of an abnormally low ambient temperature adjacent the compressor and the other condition being the increase of the condition indirectly produced by the refrigerating apparatus to a predetermined high value. Provision is also made for preventing operation of the refrigerating apparatus if the load conditions are too great or if the pressure on the high pressure side of the refrigerating apparatus is too high.

Although for purposes of illustration, I have shown several forms of my invention, other forms thereof may become apparent to those skilled in the art and consequently this invention is to be limited only by the scope of the appended claims and prior art.

I claim as my invention:

1. A control system for a refrigerating apparatus having an evaporator for controlling the condition of a medium and a mechanism for controlling the circulation of refrigerant through the evaporator, the combination of control means responsive to the condition of the medium controlled by the evaporator, control means responsive to a condition which is a measure of evaporator temperature, means controlled by both control means to operate the mechanism to start circulation of refrigerant through the evaporator only when the condition of the medium rises to a predetermined high value and the evaporator temperature rises to a predetermined value and to stop circulation of refrigerant through the evaporator only when the condition of the medium decreases to a predetermined low value regardless of the evaporator temperature, and means for operating the mechanism to start circulation of refrigerant through the evaporator independently of the condition which is a measure of evaporator temperature.

2. A control system for a refrigerating apparatus having an evaporator for controlling the condition of a medium and a mechanism for controlling the circulation of refrigerant through the evaporator, the combination of control means responsive to the condition of the medium controlled by the evaporator, control means responsive to a condition which is a measure of evaporator temperature, means controlled by both control means to operate the mechanism to start circulation of refrigerant through the evaporator only when the condition of the medium rises to a predetermined high value and the evaporator temperature rises to a predetermined value and to stop circulation of refrigerant through the evaporator only when the condition of the medium decreases to a predetermined low value regardless of the evaporator temperature, and means operative when the condition of the medium controlled by the evaporator rises above the predetermined high value for operating the mechanism to start circulation of refrigerant through the evaporator independently of the condition which is a measure of evaporator temperature.

3. A control system for a refrigerating apparatus having an evaporator for controlling the condition of a medium and a compressor, the combination of control means responsive to the condition of the medium controlled by the evaporator, control means responsive to a condition which is a measure of evaporator temperature, means controlled by both control means to start the compressor only when the condition of the medium rises to a predetermined high value and the evaporator temperature rises to a predetermined value, and means responsive to the temperature of the air adjacent the compressor for starting the compressor when the temperature of the air adjacent the compressor is below a predetermined value and the condition of the medium controlled by the evaporator rises to the predetermined high value regardless of the condition which is a measure of evaporator temperature.

4. A control system for a refrigerating apparatus having an evaporator for controlling the condition of a medium and a compressor, the combination of control means responsive to the condition of the medium controlled by the evaporator, control means responsive to a condition which is a measure of evaporator temperature, means controlled by both control means to start the compressor only when the condition of the medium rises to a predetermined high value and the evaporator temperature rises to a predetermined value and to stop the compressor only when the condition of the medium decreases to a predetermined low value regardless of the evaporator temperature, and means responsive to the temperature of the air adjacent the compressor for starting the compressor when the temperature of the air adjacent the compressor is below a predetermined value and the condition of the medium controlled by the evaporator rises to the predetermined high value regardless of the condition which is a measure of evaporator temperature.

5. A control system for a refrigerating apparatus having an evaporator for controlling the condition of a medium and a compressor driven by an electric motor, the combination of control means responsive to the condition of the medium controlled by the evaporator, control means responsive to a condition which is a measure of evaporator temperature, control means responsive to current flow through the electric motor, means controlled by all of the control means to start the electric motor and hence the compressor only when the condition of the medium rises to a predetermined value, the evaporator temperature rises to a predetermined value and the current flow through the electric motor is normal and to stop the compressor when the condition of the medium decreases to a predetermined low value or the current flow through the electric motor becomes greater than normal.

6. A control system for a refrigerating apparatus having an evaporator for controlling the condition of a medium and a compressor driven by an electric motor, the combination of, a relay for causing operation of the compressor when energized and including a maintaining switch which is closed when the relay is energized, a first switch, means responsive to the condition of the medium controlled by the evaporator for closing the first switch when the condition rises to a predetermined high value, a second switch, means responsive to a condition which is a measure of evaporator temperature for closing the second switch when the evaporator temperature rises to a predetermined value, a third switch, means responsive to the occurrence of an excessive current flow through the electric motor for opening the third switch, means for completing a circuit through the relay, the first, second and third switches to energize the relay and start the compressor, and means for completing a circuit through the relay, the first and third switches and the maintaining switch to maintain the relay energized and the compressor in operation.

7. A control system for a refrigerating apparatus having an evaporator for controlling the condition of a medium and a compressor, the combination of, a relay for causing operation of the compressor when energized and including a maintaining switch which is closed when the relay is energized, a first switch, means responsive to the condition of the medium controlled by the evaporator for closing the first switch when the condition rises to a predetermined high value, a second switch, means responsive to a condition which is a measure of evaporator temperature for closing the second switch when the evaporator temperature rises to a predetermined value, a third switch, means responsive to the temperature of the air adjacent the compressor for closing the third switch when the temperature decreases to a predetermined value, means for completing a main starting circuit through the relay and the first and second switches to energize the relay and start the compressor, means for completing an auxiliary starting circuit through the relay and the first and third switches to energize the relay and start the compressor independently of the second switch, and means for completing a maintaining circuit through the relay, the first switch and the maintaining switch to maintain the relay energized and the compressor in operation.

8. A control system for a refrigerating apparatus having an evaporator for controlling the condition of a medium, and a mechanism for controlling the circulation of refrigerant through the evaporator, the combination of, a movable control device movable to a predetermined position for causing operation of the mechanism to circulate refrigerant through the evaporator, a first control means responsive to changes in the condition of the medium controlled by the evaporator for moving the control device to the predetermined position when the condition of the medium rises to a predetermined value, and means including a second control means responsive to a condition which is a measure of evaporator temperature for preventing movement of the control device by the first control means until the evaporator temperature rises to a predetermined value and permitting movement of the control device by the first control means when the condition of the medium controlled by the evaporator rises to a predetermined higher value even though the evaporator temperature does not rise to the predetermined value.

9. A control system for a refrigerating apparatus having an evaporator for controlling the condition of a medium and a mechanism for controlling the circulation of refrigerant through the evaporator, the combination of, a switch for controlling the operation of the mechanism, a lever operating said switch and movable to a predetermined position to close the switch and operate the mechanism to circulate refrigerant through the evaporator, a first control means responsive to changes in the condition of the medium controlled by the evaporator for moving the lever to the predetermined position when the condition of the medium rises to a predetermined value, a latch for preventing movement of the lever to the predetermined position, a second control means responsive to a condition which is a measure of evaporator temperature for releasing the latch when the evaporator temperature rises to a predetermined value, and means for rendering the latch means ineffective to permit movement of the lever to the predetermined position by the first control means when the condition of the medium controlled by the evaporator rises to a predetermined higher value even though the evaporator temperature does not rise to the predetermined value to release the latch.

10. A control system for a refrigerating apparatus having an evaporator for controlling the condition of a medium and a mechanism for controlling the circulation of refrigerant through the evaporator, the combination of, a switch for controlling the operation of the mechanism, a lever operating said switch and movable to a predetermined position to close the switch and operate the mechanism to circulate refrigerant through the evaporator, a first control means responsive to changes in the condition of the medium controlled by the evaporator for moving the lever to the predetermined position when the condition of the medium rises to a predetermined value, a latch for preventing movement of the lever to the predetermined position, a second control means responsive to a condition which is a measure of evaporator temperature for releasing the latch when the evaporator temperature rises to a predetermined value, and resilient means associated with said latch to permit said lever to be moved to the predetermined position by the first control means even though the latch is not released by the second control means.

11. A control system for a refrigerating apparatus having an evaporator for controlling the condition of a medium and a mechanism for controlling the circulation of refrigerant through the evaporator, the combination of, a switch for controlling the operation of the mechanism, a lever operating said switch and movable to a predetermined position to close the switch and operate the mechanism to circulate refrigerant through the evaporator, a first control means responsive to changes in the condition of the medium controlled by the evaporator for moving the lever to the predetermined position when the condition of the medium rises to a predetermined value, a latch for preventing movement of the lever to the predetermined position, a second control means responsive to a condition which is a measure of evaporator temperature for releasing the latch when the evaporator temperature rises to a predetermined value, and a resilient mounting for said latch to permit said lever to be moved to the predetermined position by the first control means when the condition of the medium controlled by the evaporator rises to a predetermined higher value even though the latch is not released by the second control means.

12. A control system for a refrigerating apparatus having an evaporator for controlling the condition of a medium and a compressor driven by an electric motor, the combination of, a first switch, means responsive to the condition of the medium controlled by the evaporator for closing the first switch when the condition of the medium rises to a predetermined high value, a second switch, means responsive to a condition which is a measure of evaporator temperature for closing the second switch when the evaporator temperature increases to a predetermined high value, a third switch, means responsive to the occurrence of an excessive current flow through the electric motor for opening the third switch, means for completing a starting circuit through the first, second and third switches to start the electric motor and hence the compressor, a maintaining switch, means for closing the maintaining switch as an incident to completion of the starting circuit, and means for completing a maintaining circuit through the first and third switches and the maintaining switch to maintain the electric motor and hence the compressor in operation, said maintaining switch remaining closed as long as the maintaining circuit is completed.

13. A control system for a refrigerating apparatus having an evaporator for controlling the condition of a medium and a compressor driven by an electric motor, the combination of, a first switch, means responsive to the condition of the medium controlled by the evaporator for closing the first switch when the condition of the medium rises to a predetermined high value, a second switch, means responsive to a condition which is a measure of evaporator temperature for closing the second switch when the evaporator temperature increases to a predetermined high value, a third switch, means responsive to the temperature of the air adjacent the compressor for closing the third switch when the temperature decreases to a predetermined value, means for completing a main starting circuit through the first and second switches to start the electric motor and hence the compressor, means for completing an auxiliary starting circuit through the first and third switches to start the electric motor and hence the compressor, a maintaining switch, means for closing the maintaining switch as an incident to completion of either starting circuit, and means for completing a maintaining circuit through the first switch and the maintaining switch to maintain the electric motor and hence the compressor in operation, said maintaining switch remaining closed as long as the maintaining circuit is completed.

WILLIAM L. McGRATH.